(12) United States Patent
Ettensohn et al.

(10) Patent No.: US 11,176,548 B2
(45) Date of Patent: Nov. 16, 2021

(54) SYSTEMS AND METHODS FOR COLD PAYMENT SOLUTION

(71) Applicant: MFE CAPITAL, LLC, West Palm Beach, FL (US)

(72) Inventors: Marc Francis Ettensohn, West Palm Beach, FL (US); Jordan Daniel Brown, Rockledge, FL (US); Benjamin Joseph Shepley, Lake Worth, FL (US)

(73) Assignee: MFE CAPITAL, LLC, West Palm Beach, FL (US)

( * ) Notice: Subject to any disclaimer, the term of this patent is extended or adjusted under 35 U.S.C. 154(b) by 427 days.

(21) Appl. No.: 15/980,198

(22) Filed: May 15, 2018

(65) Prior Publication Data
US 2019/0354971 A1 Nov. 21, 2019

(51) Int. Cl.
*G06Q 20/38* (2012.01)
*G06Q 20/06* (2012.01)

(52) U.S. Cl.
CPC ....... *G06Q 20/3829* (2013.01); *G06Q 20/065* (2013.01)

(58) Field of Classification Search
CPC .................. G06Q 20/065; G06Q 20/3829
USPC ........................................................ 705/71
See application file for complete search history.

(56) References Cited

U.S. PATENT DOCUMENTS

| | | | |
|---|---|---|---|
| 9,436,935 B2 | 9/2016 | Hudon | |
| 9,794,074 B2 | 10/2017 | Toll et al. | |
| 10,269,009 B1* | 4/2019 | Winklevoss et al. | |
| 2015/0164192 A1 | 6/2015 | Gross | |
| 2015/0227897 A1 | 8/2015 | Loera | |
| 2015/0262171 A1* | 9/2015 | Langschaedel et al. | |
| 2015/0324789 A1 | 11/2015 | Dvorak et al. | |
| 2016/0085955 A1 | 3/2016 | Lerner | |
| 2019/0095907 A1* | 3/2019 | Govindarajan et al. | |

* cited by examiner

*Primary Examiner* — James D Nigh
*Assistant Examiner* — Yin Y Choi

(57) ABSTRACT

The present disclosure relates to off-line generation, storage, and usage of digital assets, such as cryptocurrency. In particular, methods and systems are disclosed for a system for cold payment of digital assets. In one example, a method for usage of digital assets, such as cryptocurrency, includes receiving at least one public key corresponding to at least one off-line cryptographic key pair, receiving a digital asset, determining a set of amounts for the digital asset corresponding to a user selection, assigning an amount of the digital asset to the at least one public key determined by the set of amounts, and transmitting a payment amount to a payee address corresponding to the user selection.

10 Claims, 14 Drawing Sheets

100

SYSTEMS AND METHODS FOR COLD PAYMENT SOLUTION

TECHNICAL FIELD

The present disclosure relates to off-line storage, generation, and usage of digital assets, such as cryptocurrency. In particular, methods and systems are disclosed for generating off-line cryptographic key pairs for the off-line storage of digital assets using storage techniques that do not involve connecting to the internet, or other networks.

BACKGROUND

The invention of bitcoin led to the creation of a new kind of asset class that is digital in nature. These digital assets exist entirely in computer code, are typically native to only one particular blockchain network, and often derive their value from the amount and type of community participation in the blockchain network that the assets live on. The growth in the number of digital assets, or tokens, in this new asset class has attracted large amounts of capital. These capital inflows have created two problems for individuals that want to participate in this new market: storage, and security.

These digital assets, such as cryptocurrency and other digital tokens, allow individuals to exert greater control over the storage of their assets. In particular, traditional financial institutions typically do not offer access to these assets. As such, those wishing to participate in this market are often in charge of control and storage of these assets. Digital assets are controlled through the use of cryptographic keys. These cryptographic keys are usually a pair of keys that are related to each other. One of the keys is typically held out to the public as a public key, and one of the keys is usually kept private to the user and is referred to as a private key. The private key allows the user to sign transactions, and provide a type of proof that they are the owner of the digital assets associated with the key pair. Conversely, if individuals wish to send digital assets to another user they can do so by sending the digital assets to the public key associated with the digital assets that is held out to the public. The public key in a way acts like a balance of how much of a particular digital asset is stored at that particular address. This system of keys, often referred to as a public key cryptography approach, allows individuals to exert more control over their digital assets.

When users have greater control over their digital assets they often run into additional issues that individuals may or may not be aware of. Typically, the storage of digital assets may be managed by third parties that individuals trust. The most common way that individuals store their digital assets is through the use of a wallet.

A wallet that stores digital assets is a piece of software that manages a set of cryptographic keys that are used to control access to the underlying digital assets, and to interact with the corresponding blockchain network for the digital asset. The wallet allows an individual to store, send, and receive digital assets, like cryptocurrency (e.g. Bitcoin, Ethereum, Zcash, EOS). The wallet software manages the process by which keys are used to "sign" transactions on behalf of the individual, that is provide proof that an individual owns the keys that they purport to own. A user may check their balance associated with the digital assets through the wallet software. There are a variety of different types of wallet software, such as, online wallets, desktop wallets, mobile wallets, hardware wallets, and paper wallets.

Online wallets are accessible through the internet and run by a third party service that a user contracts with. The third party service manages the access to the digital assets on behalf of the individual, and allows for the individual to store, send, and receive digital assets. While online wallets are often convenient to access, online wallets can store the private keys associated with digital assets online. Similarly, because the keys that control the digital assets are controlled by a third party that makes them more vulnerable to hacking attacks and theft, because the security of the keys is dependent on the security of the third party.

Conversely, desktop wallets are software programs that an individual downloads to their personal desktop or laptop computer. Desktop wallets are only accessible from the single computer that they have been downloaded to, which means that the user may only access and control their cryptocurrency when their computer is turned on. Desktop wallets offer improved levels of security over online wallets, however, if the computer that the desktop software is stored on is hacked or gets a virus there is the possibility that an individual may lose all of their digital assets.

A mobile wallet is wallet software that is installed and runs on an individual's internet connected smart phone. Since mobile wallets run on an application on a person's phone they are useful because they can be used anywhere that person is shopping such as at a retail store. For example, a person can open their mobile wallet and pay with a cryptocurrency using a quick response (QR) code generated by the mobile wallet. Mobile wallets have similar security issues to online and desktop wallets. An individual may lose their phone, or download a virus that impacts the digital assets stored in the mobile wallet.

Hardware wallets are another kind of wallet that typically stores a user's private keys on a hardware device like a USB drive. The private keys are usually generated while the hardware wallet is connected to an internet connected computer. Hardware wallets are usually capable of transacting in digital assets by connecting to the internet, but they are not constantly connected to the internet. Hardware wallets can be compatible with several online interfaces and can support multiple types of digital assets. Making a transaction using a hardware wallet is relatively easy. Users simply plug in their device to any internet-enabled computer or device, enter a pin, send the digital asset, and confirm the transaction. Hardware wallets make it possible to transact while also keeping your digital assets offline.

Paper wallets can simply refer to a physical copy or printout of the cryptographic keys that control a digital asset. Paper wallets can also refer to a piece of software that is used to generate a pair of cryptographic keys which are then printed. Individuals are able to use paper wallets in the same fashion as other wallets with some additional steps. Typically, those steps involve interacting with a software wallet that transfers funds to an address shown on a paper wallet controlled by the user. Alternatively, if a person wants to withdraw or spend cryptocurrency, they need to transfer funds from their paper wallet to a software wallet that they control. This can be done by the individual manually by entering private keys associated with the digital assets, or by scanning a QR code on a paper wallet.

Regardless of the type of wallet used, the security over the digital assets is of paramount concern to an individual. Security of digital assets is a multi-faceted process. A major consideration is whether and when a wallet that holds digital assets is connected to the internet. A more secure solution to storage is what is known as cold storage. Cold storage involves storing keys in a manner where the storage solution is not connected to the internet.

Current cold storage is often inconvenient and sometimes shortcuts are used that jeopardize complete safety of digital assets. For example, randomization code/software is transferred from what is usually a "hot" (connected to the internet) computer to the cold storage computer. This transfer of code inherently creates risk in itself but is yet one more burdensome step in the cold storage process. Once the code/software is on the cold storage computer it may be used to randomize and create a unique public and private key that may be finally output to a hard drive type device or paper wallet via printer. Cryptocurrency may then be loaded to the public address.

Often times cold storage is done in a less safe way by simply downloading the randomization code/software to a hot or every-day-use computer, then disconnecting the hot computer from the internet and running the randomization software, and finally producing and outputting the unique private and public keys before the computer is re-connected to the internet. This process exposes a number of vulnerabilities, for example, each time the computer is connected to the internet.

Similarly, a number of hardware wallet solutions are hot wallets protected by a hard switch; however these wallets do not provide easy portability of multiple addresses to physical locations and persons for use in transactions, or easy storage or gifting. These hardware wallets create a limited number of addresses given only one may be protected by the hard switch at a given time (and also for a limited number of cryptocurrencies) producing lack of scalability. In addition, although these devices create easier day-to-day use, cold storage is still the safest for storage, and thus storage of digital assets.

BRIEF SUMMARY

In one embodiment, a method for cold payment of digital assets is disclosed. The method may include receiving, at one or more processors, at least one public key corresponding to at least one off-line cryptographic key pair; receiving, at the one or more processors, a digital asset; determining, at the one or more processors, a set of amounts for the digital asset corresponding to a user selection; assigning, at the one or more processors, an amount of the digital asset to the at least one public key determined by the set of amounts; and transmitting, at the one or more processors, a payment amount to a payee address corresponding to the user selection. The method may include additional, less, or alternate functionality, including that discussed elsewhere herein.

In one embodiment, a method for cold payment of digital assets is disclosed. The method may include generating, at one or more processors, at least one off-line cryptographic key pair; transmitting, at the one or more processors, the at least one public key corresponding to the at least one off-line cryptographic key pair to a splitter system; transmitting, at the one or more processors, to the splitter system a set of amounts for an amount of a digital asset corresponding to a user selection; receiving, at the one or more processors, an input code from the splitter system corresponding to the set of amounts; and outputting, at the one or more processors, at least one of the off-line cryptographic key pairs based on the input code. The method may include additional, less, or alternate functionality, including that discussed elsewhere herein.

In another embodiment, a system for cold payment of digital assets is disclosed. The system may include one or more processors; one or more memories coupled to the one or more processors; one or more output devices coupled to the one or more processors; and computer executable instructions stored in the one or more memories. In some embodiments the computer executable instructions may be configured to cause the one or more processors to: receive at least one public key for at least one off-line cryptographic key pair from an off-line key generation device; receive an amount of a digital asset corresponding to a type for the at least one off-line cryptographic key public key; determine a set of amounts for the amount of the digital asset corresponding to a user selection; assign an amount of the digital asset to the at least one public key corresponding to the set of amounts; and transmit a payment amount of the digital asset to a payee address corresponding to the user selection. The system may include additional, less, or alternate functionality, including that discussed elsewhere herein.

Advantages will become more apparent to those of ordinary skill in the art from the following description of the preferred aspects, which have been shown and described by way of illustration. As will be realized, the present embodiments may be capable of other and different aspects, and their details are capable of modification in various respects. Accordingly, the drawings and description are to be regarded as illustrative in nature and not as restrictive.

BRIEF DESCRIPTION OF DRAWINGS

The figures described below depict various embodiments, features, and aspects of the system and methods disclosed herein. It should be understood that each figure depicts an embodiment of a particular aspect of the disclosed system and methods, and that each of the figures is intended to accord with a possible embodiment thereof. Further, wherever possible, the following description refers to the reference numerals included in the following figures, in which features depicted in multiple figures are designated with consistent reference numerals.

Figure 1:
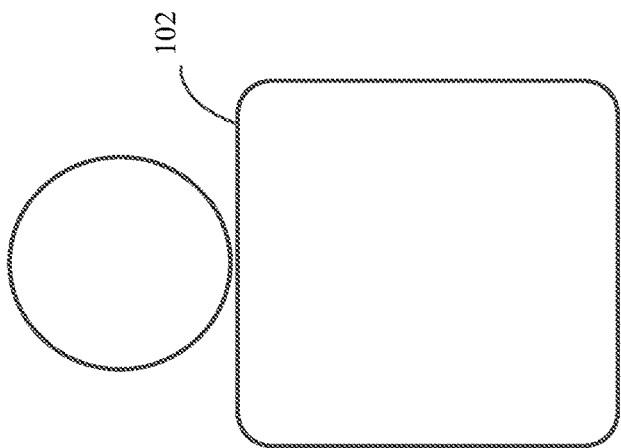
FIG. 1 relates to a system for generating off-line cryptographic key pairs for storing digital assets.
Figure 1:
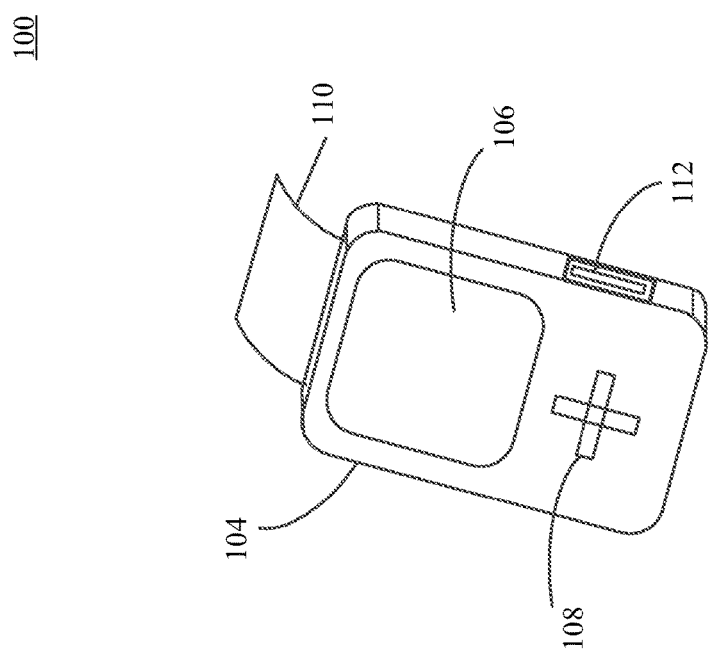

The figures depict aspects of the present embodiments for purposes of illustration only. One skilled in the art will readily recognize from the following discussion that alternate aspects of the structures and methods illustrated herein may be employed without departing from the principles of the invention described herein.

DETAILED DESCRIPTION

The present disclosure relates to storage of digital assets, such as cryptocurrency or tokens. In particular, methods and systems are disclosed for the off-line storage of cryptocurrency using storage techniques that do not involve connecting to the internet, as well as systems and methods for off-line payment utilizing the off-line storage techniques disclosed herein.

In one example, the present embodiments may relate to a device that reduces burdensome steps associated with current wallet solutions while offering improved safety. The proposed device may have no capabilities of internet connection via wireless, ETHERNET, or other means. This device may combine a processor to execute applications, perform randomization, execute a key generation algorithm, and produce any unique private and public keys for a corresponding cryptocurrency, and then subsequently output these keys via the convenience of a USB drive or paper via a built-in printing mechanism. Thus, a user may use the output public address/key to load their off-line storage, or cold storage, wallet with digital assets of their choosing.

This device may make use of software that is stored on the device in firmware. For example, the software may be hardcoded into memory on the device at the time of the device's creation at a manufacturing facility where during creation the device is not connected to the internet in any fashion. Any of the software utilized by the device may be stored in firmware. In particular, the randomization and key generation software may be encoded in firmware. Additionally, the device may utilize a key generation manager to coordinate and oversee the generation and utilization of the public private key pairs. This key generation manager may be encoded in firmware, but need not be.

This device may require minimal computing power; however enough power would be needed to run randomizing software for multiple different types of cryptocurrency, or digital assets, cold storage wallets. Randomization may be achieved by using or modifying pre-existing open source software to accommodate for a touchscreen for the randomization process as opposed to current use in many storage solutions via mouse cursor. Such randomization code may be created or modified to adjust to the needs of device functionality that may allow randomization in a variety of different ways rather than touch screen e.g. punching hard-switch buttons, utilization of a roller ball, or combos thereof.

Some example benefits of this approach may include that the device may not connect to the internet; convenience in that a user does not have to buy separate necessary components to create an offline computer that is safe enough to create cold storage wallets; ease of use in that a user may create addresses and keys to accommodate for physical gift, or physical transaction, of digital assets via secure cold storage on paper or (USB) hard drive; scalability in that any number of cold storage wallet addresses may be produced that are only limited by the time it takes for the user to randomize and output keys to a USB device or printed paper. Additionally, the device may provide for any number of digital assets that may be added to the device for use including other non-blockchain cryptocurrencies such as, for example, IOTA or other digital assets based on distributed ledger technology. Chain splitting and other "updates" to the underlying blockchain network for the digital asset may require an update of firmware, software or device for full utilization. Generally speaking, there may also be uses for the system to generate keys to access or process relevant data related to blockchains, directed acyclic graph (Tangle), Corda, hashgraph, graphchain, the Cicada platform, or other digital assets, distributed ledgers, encrypted databases, and general cryptographic communications/algorithms.

The disclosure also relates to systems and methods of off-line payment referred to as a cold payment solution that utilizes the off-line key generation techniques discussed herein. In particular, a cold storage device may be used in conjunction with software on a user's smart phone, computer, or other device that may be able to connect to the internet. This software may be referred to as a splitter piecer system. The splitter piecer system may manage assigning digital assets to off-line generated keys generated by the device that are then used as part of a transaction designated by the user. Through the use of the splitter piecer system a user may be able to generate keys without ever connecting to the internet and utilize those keys to engage in transactions without ever exposing private keys intentionally or unintentionally on a network, and thus, eliminating any type of security threats brought about by networks.

FIG. 1 relates to an example embodiment of a system 100 for generating off-line cryptographic key pairs (a key pair refers to the private and public keys that correspond to one another) for storing or transacting in digital assets in accordance with the material disclosed herein. The generated cryptographic key pairs may be secure in the sense that they are generated by the system 100 without ever connecting to the internet. This prevents potential attacks on the generation of the keys.

FIG. 1 may include a user 102, a device 104, a display screen 106, an input module 108, a printer 110 that is built into the device and prints out paper keys, and an external port 112, such as a USB port. In some embodiments, the system 100 may include additional, fewer, or different components. The components of the system 100 may be communicatively coupled together to facilitate information exchange to effectuate the functionality discussed herein. The device 104 may utilize any components discussed herein, for example, the components discussed later with respect to FIG. 11.

In an example embodiment, the user 102 may wish to generate an off-line cryptographic key pair. The user 102 may interact with the device 104, which may be a handheld device, and by interacting with the device 104 the user 102 may indicate through the use of the input module 108 (and any corresponding applications stored on the device 104) what type of digital asset for which they wish to generate an off-line cryptographic key pair for, and how they wish to output the generated keys. The device may then output the keys according to the user indicated preferences. The user 102 then produces via device 104 paper printout(s) of the cryptographic key pair(s), and/or the key pair(s) may be transferred to a storage device (e.g. USB).

In some embodiments, the device 104 may include a key generation manager stored as an application on the device 104 THAT is responsible for monitoring user input, such as randomization input utilized in generating keys via a variety of key generation algorithms, as well as maintaining a list of all available key generation algorithms. In some embodiments, the user 102 may be aware of the key generation manager, i.e. the application is one that the user interacts with, and in other embodiments they may not, i.e. the application runs in the "background" and is run when needed by the device 104. as the user interacts with the device 104, and potentially the key generation manager, the input they enter may be temporarily stored in memory until a sufficient level of randomization is reached.

In some embodiments, the generated off-line cryptographic key pairs may be generated as multiple parts that must be used together to control the digital assets. The number of parts to break up the off-line cryptographic key pairs may be determined by the user, stored in preferences for the user, or automatically determined by the system according to the users preferences. These parts may be output as paper, output via storage device (e.g. USB), or output using a combination of both. This adds additional security for the user 102. For example, the private key associated with a generated cryptographic key pair may be generated by the system 100, and then broken up into two or more parts that can each be output separately from each other (e.g. Output on multiple pieces of paper, or multiple USB drives). The user may then use the multiple output items (e.g. Pieces of paper, or multiple USB drives), on which the private key is output, to access their digital assets. This allows a user of the system 100 more control, and potentially greater security.

FIGS. 2A-2d relate to a device, and a variety of input types related to randomization input from a user which allows for unique key pairs to be produced by the users themselves. The device may be the device 104 discussed with respect to FIG. 1, or may be another device capable of performing the same or similar functions. Regardless, the device may utilize a variety of different input types as detailed in the corresponding figures. Additionally, in some embodiments the layout of the particular input methods, as well as the other components depicted on the device may be important for ease of use for a user. The number of components depicted may in some embodiments be more or fewer than what is depicted in the figures as dictated in part by desired functionality for the device 104.

Figure 2A:
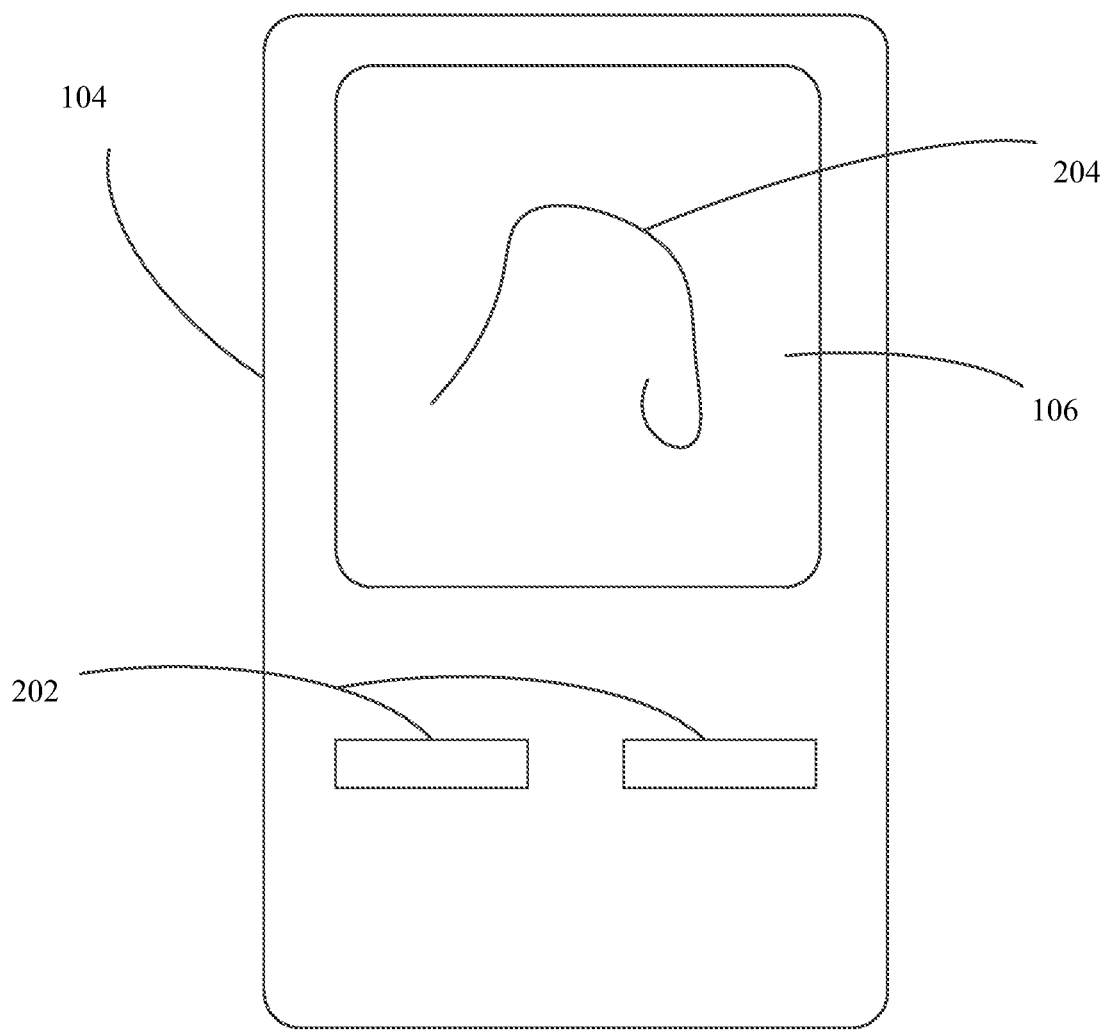
FIGS. 2A-2D relate to a device, and a variety of input types related to randomization input from a user.

In particular, FIG. 2a discloses a device 104 with a display screen 106 that via the use of input buttons 202 a user, such as the user 102 of FIG. 1, may create randomization input 204 that is utilized in a key generation algorithm on the device 104. The input buttons 202 depicted indicate only two buttons, but additional buttons may be included, or fewer buttons may be utilized.

Figure 2B:
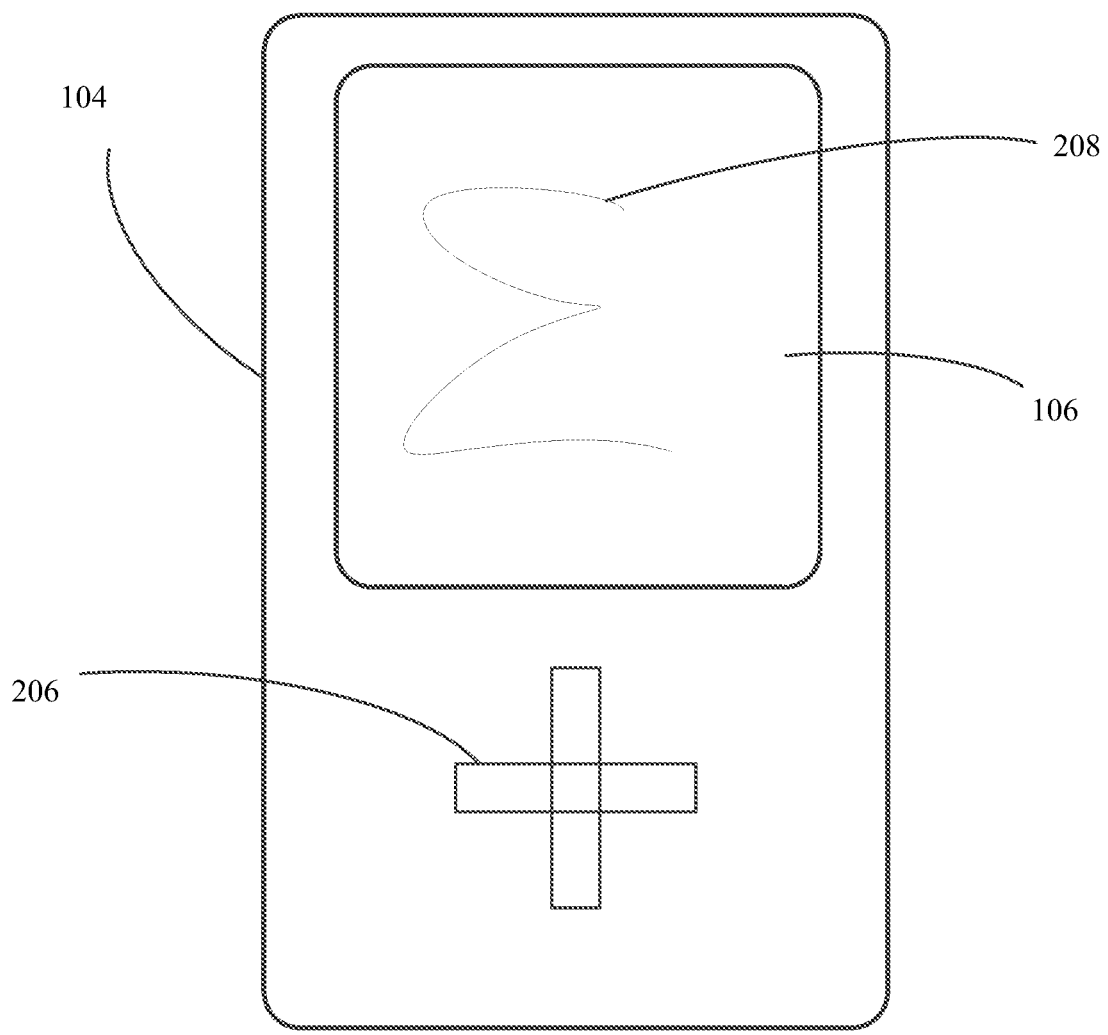

FIG. 2b depicts a device 104 with a display screen 106 that via the use of input buttons 206 a user, such as the user 102 of FIG. 1, may create randomization input 208 that is utilized in a key generation algorithm on the device 104. In FIG. 2b, the input buttons 206 are depicted in a cross configuration that may be advantageous from a manufacturing perspective of the device, as well as an ease of use perspective for users of the device 104.

Figure 2C:
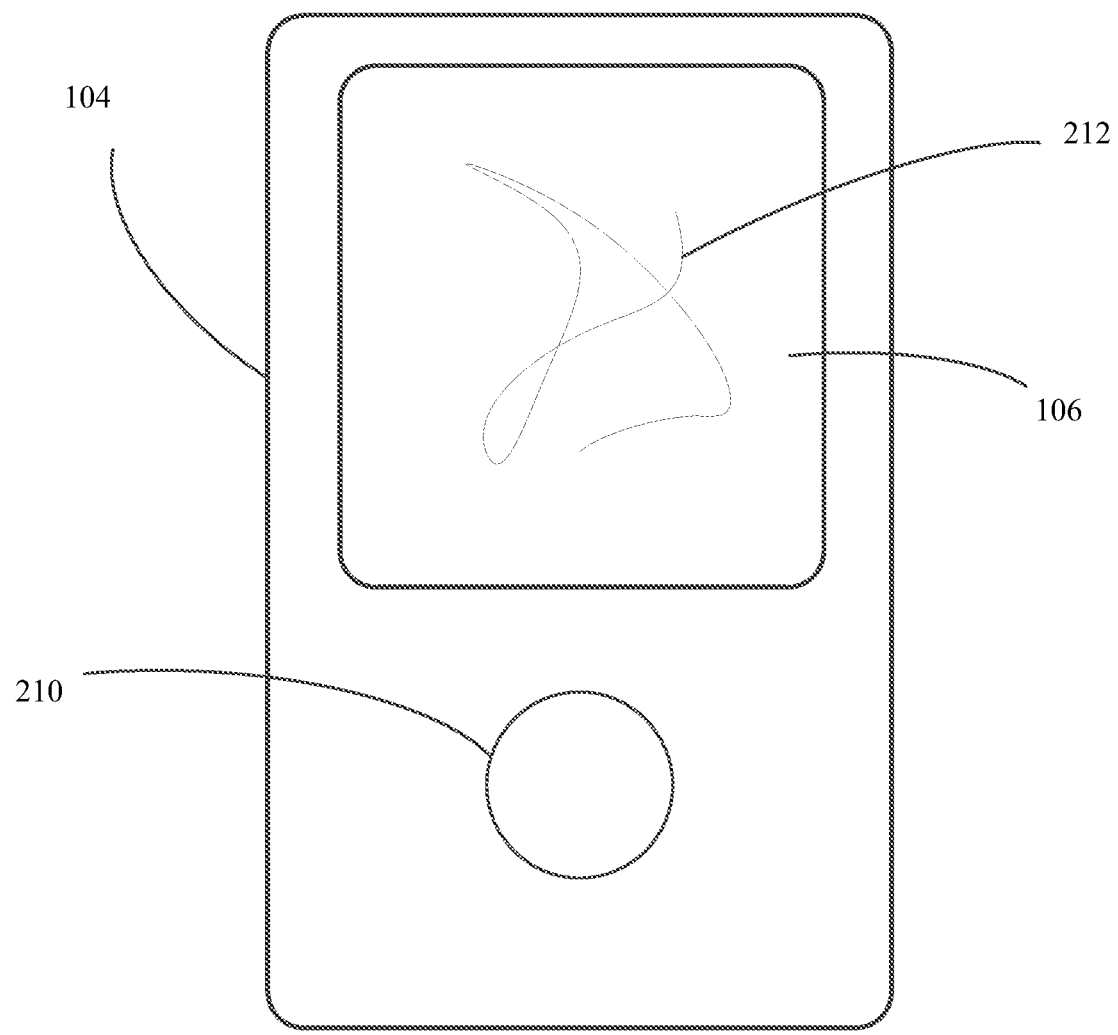

Alternatively, FIG. 2c depicts a device 104 with a display screen 106 that via the use of a trackball 210 a user, such as the user 102 of FIG. 1, may create randomization input 212 that is utilized in a key generation algorithm on the device 104. In some embodiments, the trackball 210 may instead be a track pad that a user drags a finger across.

Figure 2D:
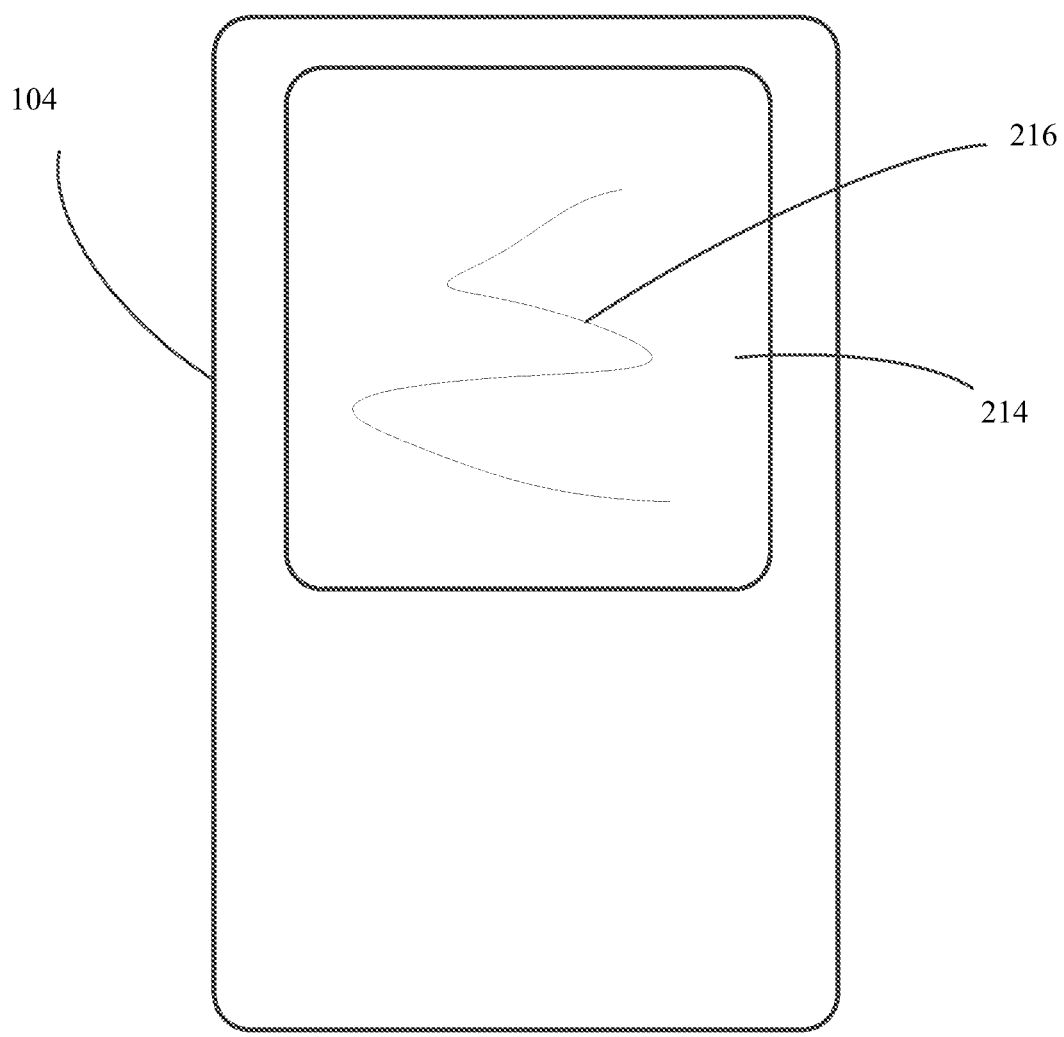

Lastly, FIG. 2d depicts a device 104 with a touchscreen 214 a user, such as the user 102 of FIG. 1, may create randomization input 216 that is utilized in a key generation algorithm on the device 104. In this embodiment, the touchscreen may be both a display screen for communicating information to a user, as well as an input screen to capture user input for use in generating the off-line cryptographic key pairs.

Figure 3:
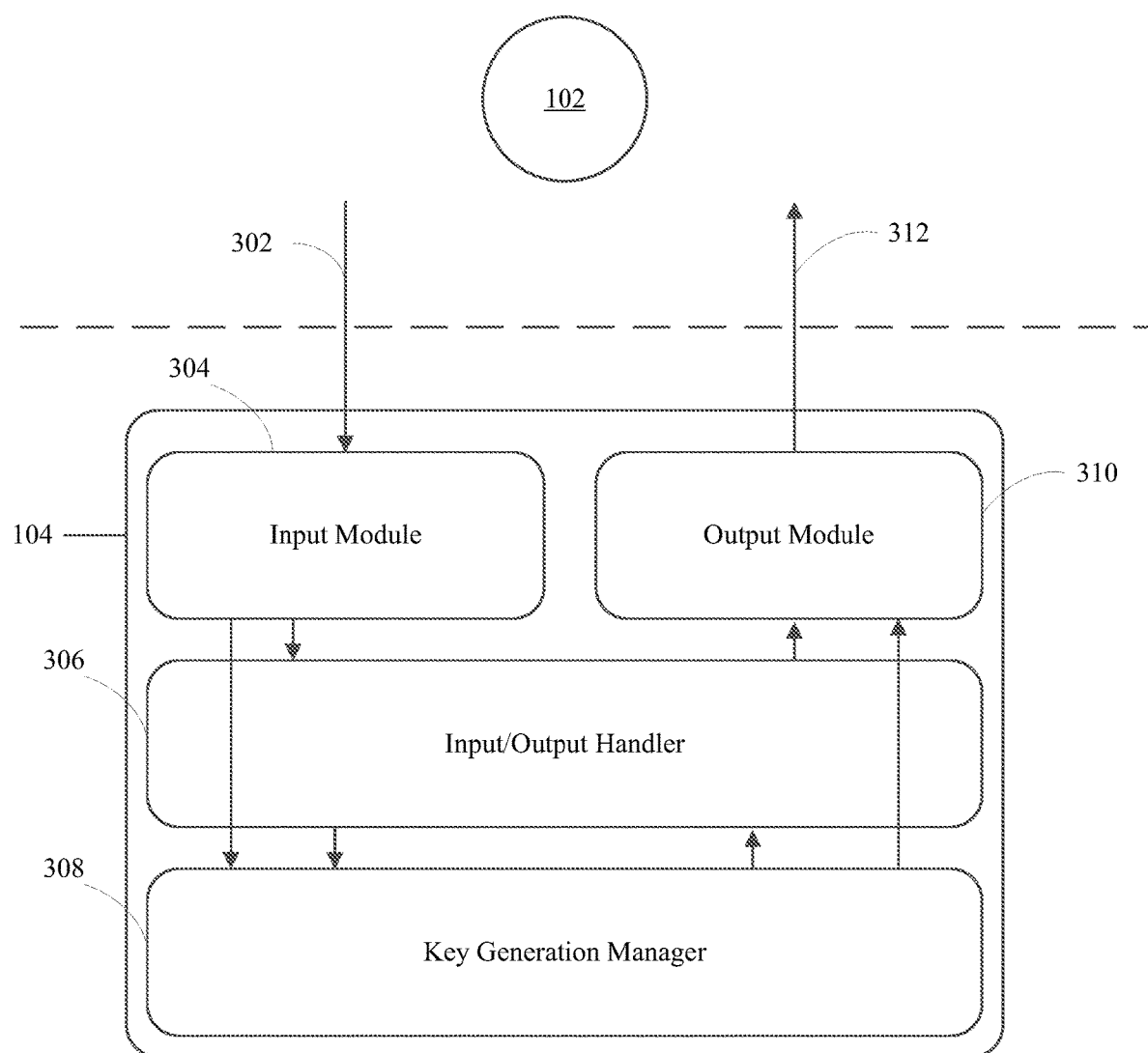
FIG. 3 relates to a model for how information flows in a system for generating off-line cryptographic key pairs for storing digital assets.

FIG. 3 relates to a model 300 illustrating how information flows in a system for generating off-line cryptographic key pairs for storing digital assets. This model may be considered an abstraction of how information flows in the systems and methods discussed herein for off-line cryptographic key pair generation, storage, and usage, but the model is not the only way that the components disclosed herein may be organized to facilitate the flow of information in the device. That said, in some embodiments, the depicted components in FIG. 3 may be coded into software, or coded into hardware modules that are discussed later in the specification. Regardless, the model 300 showcases how data may flow through a system for generating off-line cryptographic key pairs. The components of the model 300 may be communicatively coupled together to facilitate information exchange to effectuate the functionality discussed herein. Similar to the device in FIG. 1, the device 104 may utilize any components discussed herein, for example, the components discussed later with respect to FIG. 11.

FIG. 3 may include a user 102, a device 104, user input 302, an input module 304, an input/output handler 306, a key generation manager 308, an output module 310, and output 312. Again, these components may be considered part of an abstract model of how information flows and is handled. In some embodiments, each component may include one or more software programs or pieces of hardware.

In an example flow of information a user 102 wishes to generate an off-line cryptographic key pair. The user 102 may input data 302 into the device 104. That data may be received at the input module 304. The data 302 may then either be communicated to the input/output handler 306, or directly communicated to the key generation manager 308. In some cases, the input/out handler 306 may receive user input 302 and transform the data into a format that is readable, or operable, by the key generation manager 308. Regardless of how the user input reaches the key generation manager 308, the key generation manager 308 utilizes the user input 302 to generate an off-line cryptographic key pair according to a key generation algorithm. The generated cryptographic key pair may be communicated to either the input/output handler 306, or directly to the output module 310 for outputting 312 per the user's 102 preferences.

Figure 4:
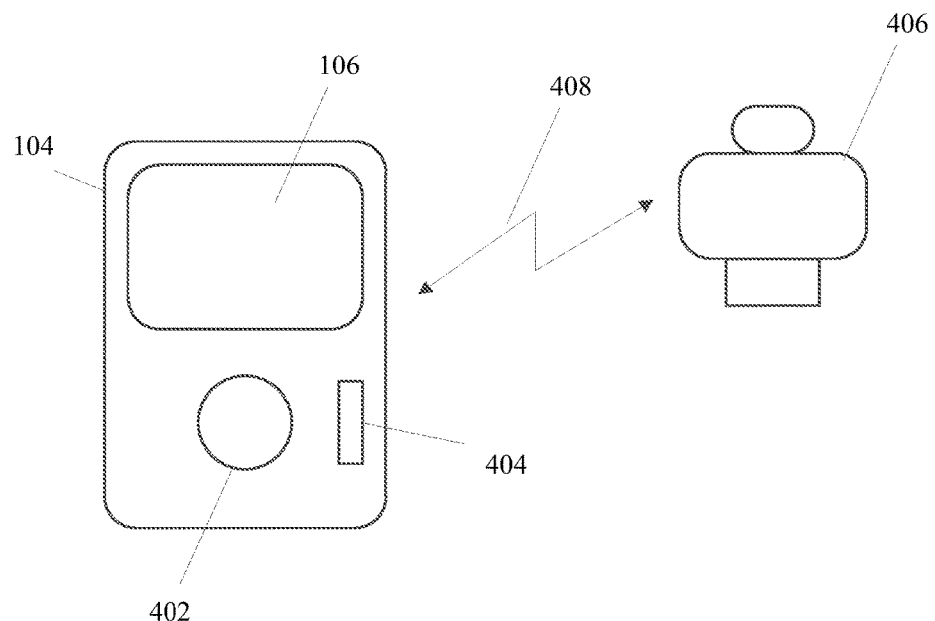
FIG. 4 relates to example types of output of off-line cryptographic key pairs that are capable via the methods and systems disclosed herein.
Figure 4:
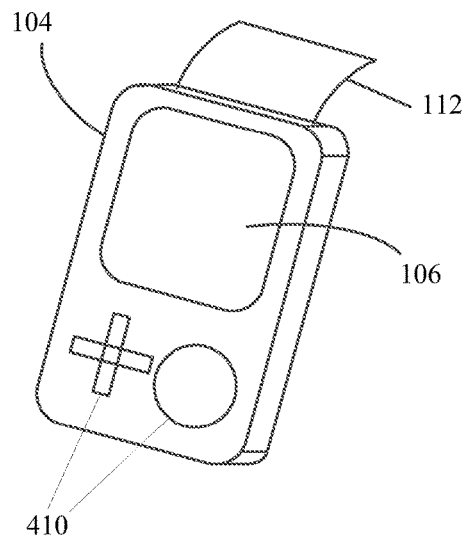

FIG. 4 relates to example types of output that are capable via the methods and systems disclosed herein. Depicted in FIG. 4 are two different types of devices 104 that have different output methods, such as a built-in printer, and a USB port. In some embodiments, the device 104 may have both output methods.

For example, at 412 the device 104 is shown to have a trackball input method 402, a display screen 106, and a USB port 404. Alternatively, the device 104 may output to a USB drive connected to the USB port 404 and subsequently connect the USB drive to the printer 406. In some embodiments, the device 104 may have multiple ports that allow for outputting to micro-USB, secure digital cards, micro secure digital cards, hard drives, or other storage device/drives. Accordingly, regardless of port type, the port 404 may be used for outputting of digital assets public private key pairs, may be used for power supply, may be used to update firmware, and/or may be used to add new digital assets to the device. The printer 406 may not have access to any type of network connectivity for added security.

At 414, the device 104 may include a display screen 106, a plurality of input methods 410, and a printer 112. The printer 112 may be self-contained within the device 104.

This allows for quick and easy output of digital assets in a secure physical manner that is easily transferrable by the user of the device 104.

In some embodiments, the device 104 may have near field communication, or secure Bluetooth capability that allows the device 104 to output the off-line cryptographic key pairs.

Figure 5:
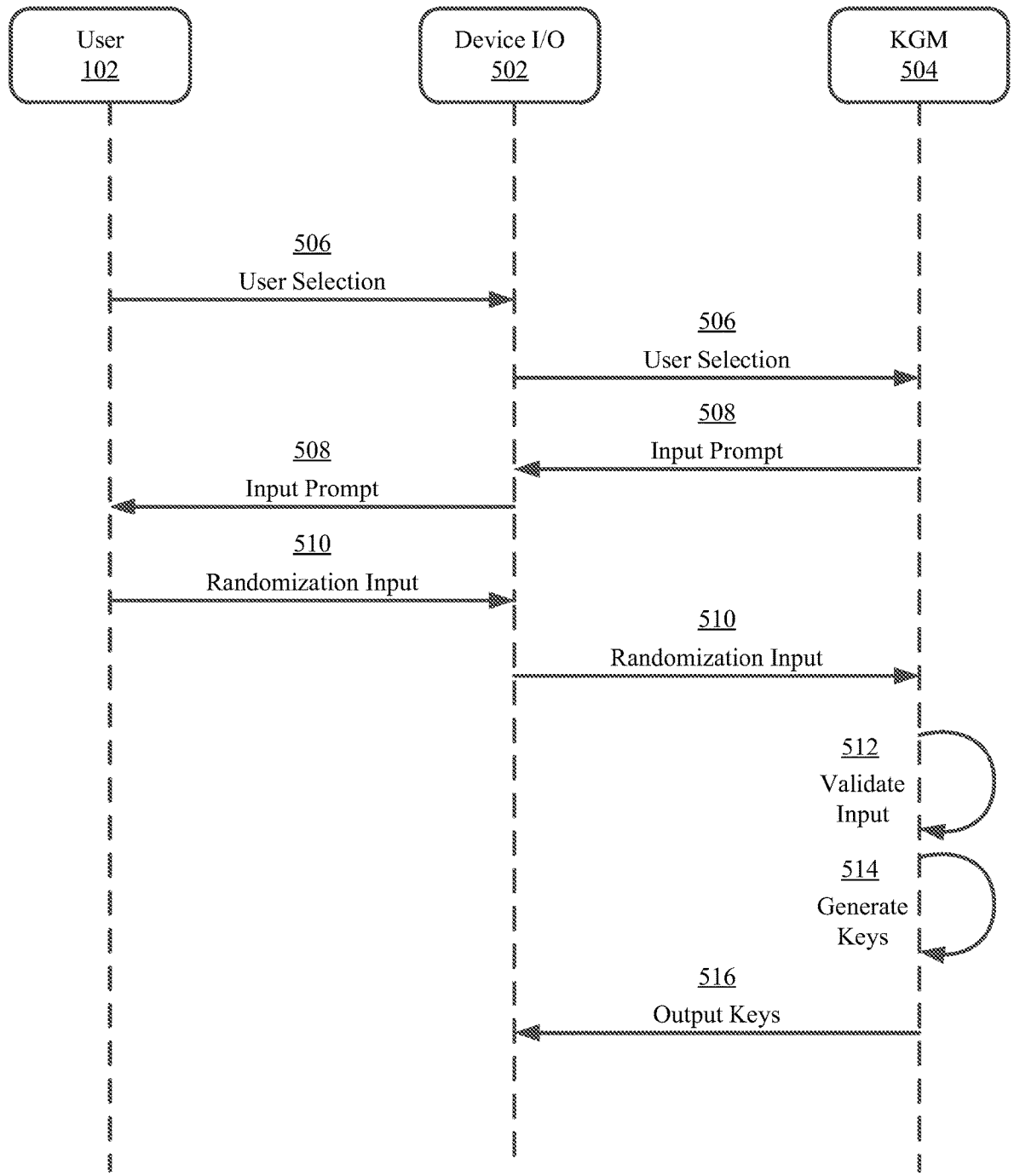
FIG. 5 relates to a sequence diagram for off-line cryptographic key pair generation.

FIG. 5 relates to a sequence diagram 500 for off-line cryptographic key pair generation. The depicted sequence of events is meant to portray only one embodiment, and not the sole embodiment of generating off-line cryptographic key pairs.

The sequence diagram 500 includes a user 102, a device input/output 502, and a key generation manager 504. In some embodiments, additional or fewer components are included, for example, an input/output handler as discussed with respect to FIG. 1.

In a typical embodiment, a user 102 wishes to generate an off-line cryptographic key pair. The user may make a selection 506 that indicates their preferences for the off-line cryptographic key pair. The user selection 506 may be received by the device input/output 502. The device input/output 502 may transmit the user selection 506 to the key generation manager 504. The key generation manager may decode the user selection, and select the necessary key generation algorithm thus prompting the user 508 to begin randomization input. The input prompt 508 may be received by the device input/output 502 that communicates the input prompt 508 to the user 102. The user 102 may then input randomization input 510. This randomization input 510 may be received by the device input/out 502 and transmitted to the key generation manager 504. The key generation manager 504 may validate the input 512 performing a check to ensure that a sufficient level of randomization is reached for the underlying key generation algorithm, and subsequently generate the keys 516. In order to check whether the sufficient level of randomization is reached the input may be stored temporarily in memory, so that the key generation manager may monitor the level of randomization. In the event that there is an insufficient level of randomization in the input the user may be prompted at 514 to enter additional input until a sufficient level of randomization is reached. Once the sufficient level of input is reached the keys may then be generated. The keys may then be output 518 to the device input/output according to the user's preferences, or the user selection 506. The particular sequence of events depicted in the sequence diagram 500 is illustrative of one embodiment, and may include additional, fewer, or different events in other embodiments.

Figure 6:
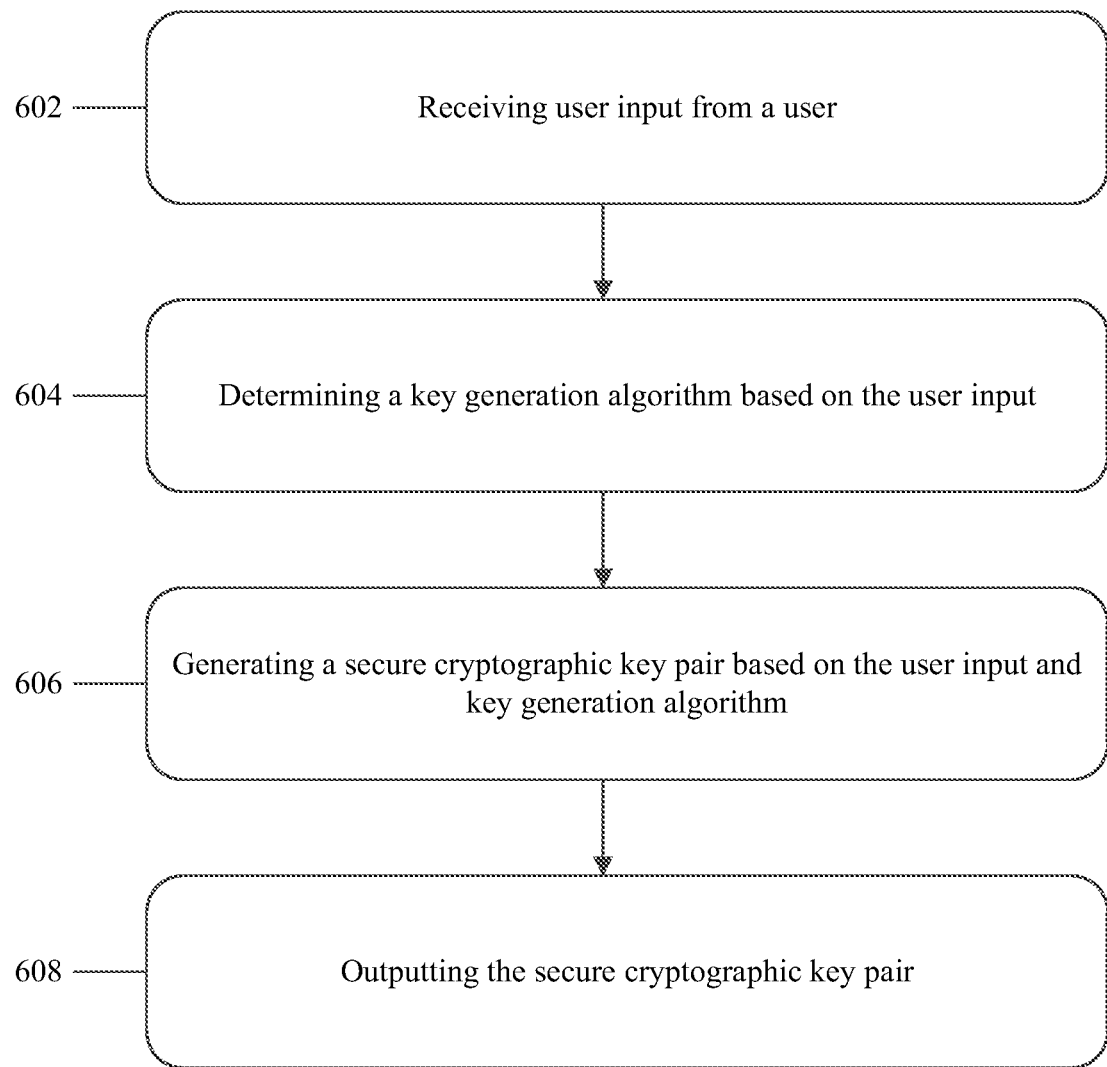
FIG. 6 relates to an example embodiment for implementing a method for generating off-line cryptographic key pairs for storing digital assets.

FIG. 6 relates to an example embodiment for implementing a method for generating off-line cryptographic key pairs for storing digital assets. The method may be executed by a device, such as the device depicted in FIGS. 1-5, by a user wishing to securely store their digital assets without connected to the internet. The depicted method may make use of the systems depicted herein, such as the systems depicted in FIGS. 1 and 11. The method may include additional, fewer, or different steps depending on the functionality desired.

In one embodiment a method for generating off-line cryptographic key pairs for storing digital assets is disclosed. The method may include receiving, at one or more processors, user input from a user at block 602. In some embodiments, the user input indicates a selection of a type of digital asset. The selection may be made by a user of the device executing the method. In other embodiments, the user input is randomization input created by the user. In some cases, the randomization input is created by the user actuating a set of buttons, swiping their finger across a touchscreen, touch-pad, manipulating a roller ball, or a combination thereof. In other embodiments, the user input includes both the selection of a digital asset and randomization input. For example, the user may receive multiple prompts for selections and randomization input before that user input is ultimately transmitted to the underlying key generation algorithm, or key generation manager.

At block 604, the method may include determining, at the one or more processors, a key generation algorithm based on the user input, wherein the key generation algorithm relates to a digital asset. The key generation algorithm may be determined by the key generation manager according to a selection made by the user included in the user input. Put another way, in some embodiments, determining a key generation algorithm further comprises selecting, at the one or more processors, the key generation algorithm that corresponds to a type of digital asset determined by the user. Each digital asset may have its own unique key generation algorithm.

At block 606, the method may include generating, at the one or more processors, an off-line cryptographic key pair based on the user input and key generation algorithm. In order to generate the off-line cryptographic key pair the key generation algorithm requires randomization input. This randomization input may be supplied by the user, or in other embodiments the device may supply pseudo randomized input generated on the device. In some embodiments, when the user input includes randomization input, generating the off-line cryptographic key pair further comprises monitoring, at the one or more processors, a level of randomization in the user input. The level of randomization may be set by the user, set by the device, set by an industry standard, or some combination thereof. For reference purposes, to monitor the level of randomization in the input, the input may be temporarily stored in memory. Similarly, in some embodiments monitoring the level of randomization in the user input further comprises comparing, at the one or more processors, the user input to a threshold level, and if the user input crosses the threshold level: generating, at the one or more processors, an alert to the user that a sufficient level of randomness has been reached; or if the user randomization input does not cross the threshold level: generating, at the one or more processors, an alert to the user that the sufficient level of randomness has not been reached.

In yet other embodiments, monitoring the level of randomization in the user input further comprises storing, at one or more memories, the user input until a threshold level is met for the user input. Once the threshold level is met the user input, and attendant level of randomization, may be removed from the one or more memories by the device.

At block 608, the method may include outputting, at the one or more processors, the off-line cryptographic key pair. In some instances, outputting the off-line cryptographic key pair further comprises printing, at one or more output devices, the off-line cryptographic key pair, transmitting, at the one or more output devices, the off-line cryptographic key pair to an external device, paper, or a combination thereof. The ways in which the off-line cryptographic key pairs may be output may include the output methods and techniques depicted in FIG. 4.

In other embodiments, the method further comprises outputting, at one or more output devices, at least one or more cryptographic key parts related to the off-line cryptographic key pair to a splitter piecer system; receiving, at the one or more output devices, an input code from the splitter piecer system; and updating, at the one or more processors, the off-line cryptographic key pair with the input code. The method may thus further include outputting the cryptographic key pairs to a system that may allow a user to engage in off-line, or cold, payments using their digital assets.

Further, in some embodiments of the method, generating an offline cryptographic key pair may include generating a tag, or pin, for the offline cryptographic key pair. This tag may be a non-random code that may be used as a category indicator for a type of digital asset stored at the key pair. In another embodiment, this tag or pin may be used by the splitter piecer system to assign certain values to different types of categorical key pairs. Alternatively, the tag may allow for verification that a transaction is correct if a user is attempting to send digital assets to the splitter piecer system. In some embodiments, the tag may be included as part of the public key as a non-random part of a larger randomized key.

In another embodiment, a system for generating off-line cryptographic key pairs for storing digital assets is disclosed. The system may include one or more processors; one or more memories coupled to the one or more processors; one or more output devices coupled to the one or more processors; and computer executable instructions stored in the one or more memories. In some embodiments the computer executable instructions are configured to cause the one or more processors to: receive user input from a user; determine a key generation algorithm based on the user input, wherein the key generation algorithm relates to a digital asset; generate an off-line cryptographic key pair based on the user input and key generation algorithm; and output the off-line cryptographic key pair.

In some embodiments of the system, the user input indicates a selection of a type of digital asset, the user input is randomization input created by the user, or combinations thereof. Similarly, in some embodiments the randomization input is created by the user actuating a set of buttons, swiping their finger across a touch-screen, manipulating a roller ball, or a combination thereof.

In some embodiments of the system, to determine a key generation algorithm computer executable instructions are further configured to cause the one or more processors to: select the key generation algorithm that corresponds to a type of digital asset determined by the user.

In other embodiments of the system, to generate the off-line cryptographic key pair the computer executable instructions are further configured to cause the one or more processors to: monitor a level of randomization in the user input. As such, in some embodiments, to monitor the level of randomization in the user input the computer executable instructions are further configured to cause the one or more processors to: compare the user input to a threshold level, and if the user input crosses the threshold level: generate an alert to the user that a sufficient level of randomness has been reached; or if the user randomization input does not cross the threshold level: generate an alert to the user that the sufficient level of randomness has not been reached. Alternatively, in some embodiments of the system, to monitor the level of randomization in the user input the computer executable instructions are further configured to cause the one or more processors to: store the user input until a threshold level is met for the user input.

In some embodiments of the system, to output the off-line cryptographic key pair the computer executable instructions are further configured to cause the one or more processors to: print the off-line cryptographic key pair transmits the off-line cryptographic key pair to an external device, or a combination thereof.

The system may also include, in some embodiments, computer executable instructions further configured to cause the one or more processors to: output at least one or more cryptographic key parts related to the off-line cryptographic key pair to a splitter piecer system; receive an input code from the splitter piecer system; and update the off-line cryptographic key pair with the input code.

Figure 7:
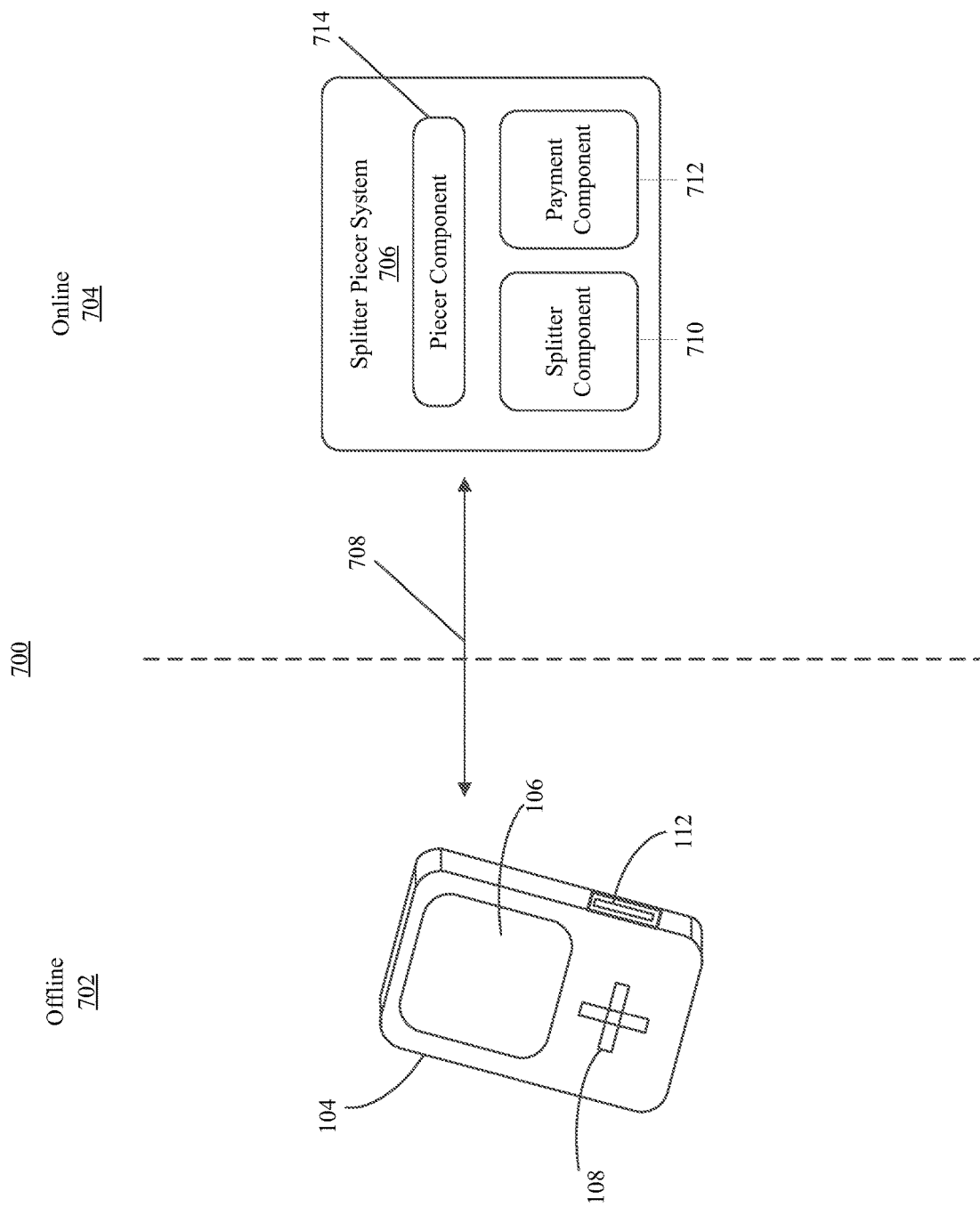
FIG. 7 relates to a cold payment system utilizing the cold storage techniques disclosed herein.

FIG. 7 relates to a cold payment system utilizing the cold storage techniques disclosed herein. As discussed above, an off-line payment solution referred to as a cold payment solution that utilizes the off-line key generation techniques discussed herein is disclosed. In particular, a cold storage device may be used in conjunction with software on a user's smart phone, computer, or other device that may be able to connect to the internet. In some embodiments, the system 700 may include additional, fewer, or different components. The components of the system 700 may be communicatively coupled together to facilitate information exchange to effectuate the functionality discussed herein. The device 104 and splitter piecer system 706 may utilize any components discussed herein, for example, the components discussed later with respect to FIG. 11.

The cold payment system 700 may include a device 104, splitter piecer system 706, an offline environment 702, and an online environment 704. The device 104 and splitter piecer system may communicate with each other over a communication channel 708, physical or otherwise. The device 104 may include a screen 106, and input module 108, and an external port 112. The splitter piecer system 706 may include a splitter component 710, a payment component 712, and a piecer component 714.

In an example embodiment, a user of the device 104 wishes to make a payment of an amount of a digital asset utilizing off-line generated cryptographic key pairs. A number of key pairs are generated by the device 104, and public key components of the pairs are transmitted to the splitter piecer system 706. The number of key pairs may be generated in part by using the randomization software on the device as described above. The corresponding keys may be output, and the corresponding public keys are transmitted to the splitter piecer system 706.

The splitter piecer system 706 may receive an amount of a digital asset. The amount of the digital asset may be determined by, or under the direction of, the user of the device 104. The splitter component 710 may divide the amount of the digital asset in a randomized approach or by means of binary division wherein each amount of cryptocurrency is broken into pieces using a base of 2 and binary expansion is used for outputting an amount; however this approach may be specified by the user or automated via settings that may be changed. Specifically, more divisions result in a more accurate payout amount that is stored in cold storage; however, the user may suffer a degraded user experience by having to manage a higher number of keys in the payment/output. The splitter component 710 may assign amounts of the received digital asset to the received public keys. The user may then determine the amount of the digital asset they wish to transmit. The remaining difference thus corresponds to only some of the public keys received by the system 706. The piecer component 714 then transmits the received public keys or a unique code/derivative based on the random public keys that have a balance back to the device 104. The device 104 then outputs those key pairs that contain a balance of the digital asset. In one embodiment the device 104 is only able to output key pairs based on the input of associated public keys (assigned by the splitter piecer system) that have already been randomly generated by the device itself, or unique codes/derivatives based on the random public keys the device generates. In this way, the device only accepts inputs that are based on previous randomization created by the device.

In some embodiments, the cold payment system 700 or splitter piecer 706 system may require a token based on distributed ledger technology in order to process payments. The token may have no interaction with the key generation device but instead interacts with the online software and public keys produced by the device. In one embodiment, the token may provide a user access that allows to the system to process payments. As such, in some embodiments use of the token may incur a fee to the user for processing payments. For example, the fee may be deducted from the token amount, or the fee may be deducted from a digital asset balance that the user has stored elsewhere. In one embodiment this token may function as a protocol that allows the cold payment system 700 or splitter piecer 706 system to operate. In one embodiment the token may require a system of smart contracts that allows functionality to process payments.

Figure 8:
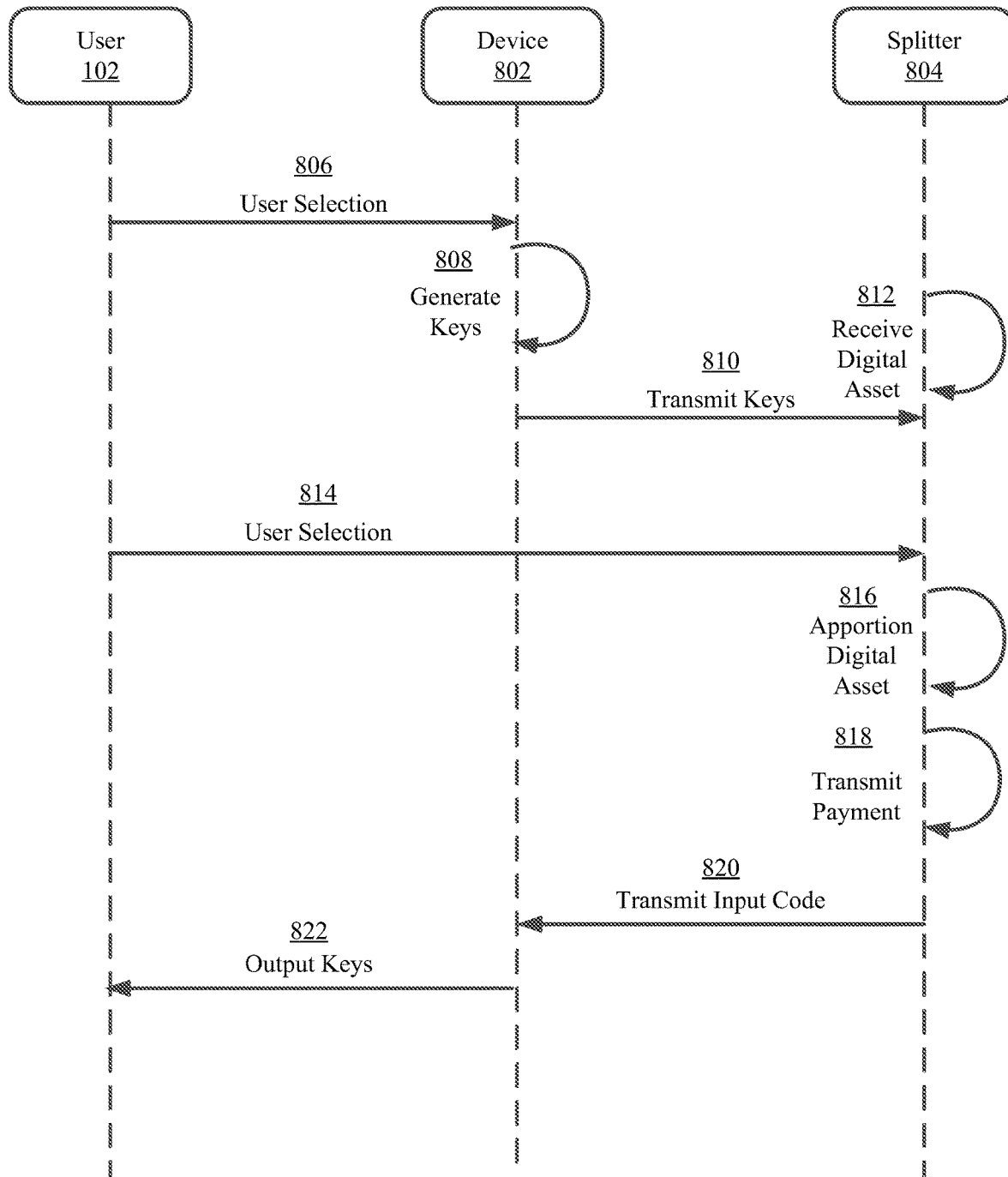
FIG. 8 relates to a sequence diagram for cold payment utilizing the cold storage techniques disclosed herein.

FIG. 8 relates to a sequence diagram 800 for cold payment utilizing the cold storage techniques disclosed herein. The depicted sequence of events is meant to portray only one embodiment, and not the sole embodiment of cold payment utilizing the cold storage techniques.

The sequence diagram 800 may include a user 102, a device 802, and a splitter 804. The splitter 804 may include both the splitter component and piecer component disclosed in FIG. 7. In some embodiments, additional or fewer components are included.

Typically, as discussed with respect to FIG. 7, a user 102 may wish to make a cold payment utilizing off-line generated cryptographic key pairs. The user may make a selection 806 that is transmitted to the device 802. The device may generate the keys 808 corresponding to the selection 806. The generation process followed may be the same as that described with respect to FIGS. 1-6. Once the keys are generated they may be transmitted 810 to the splitter 804. The splitter may before receipt of the keys, at the same time as, or after receipt, receive an amount of a digital asset. Then the user 102 may make a selection 814 as to how much of the digital asset they would like to spend. This user selection may be communicated directly to the splitter 804. The splitter 804 may apportion the digital asset 816 taking into consideration the number of keys received, and the amount of the payment. The splitter 804 may then transmit the payment 818. Once the payment is transmitted the splitter 804 may transmit an input code unique to the series of public keys 820 indicating the apportionment of the digital asset to received public keys to the device 802. The device 802 may then output the key pairs that have a balance associated with them to the user 102. The particular sequence of events depicted in the sequence diagram 800 is illustrative of one embodiment, and may include additional, fewer, or different events in other embodiments.

Figure 9:
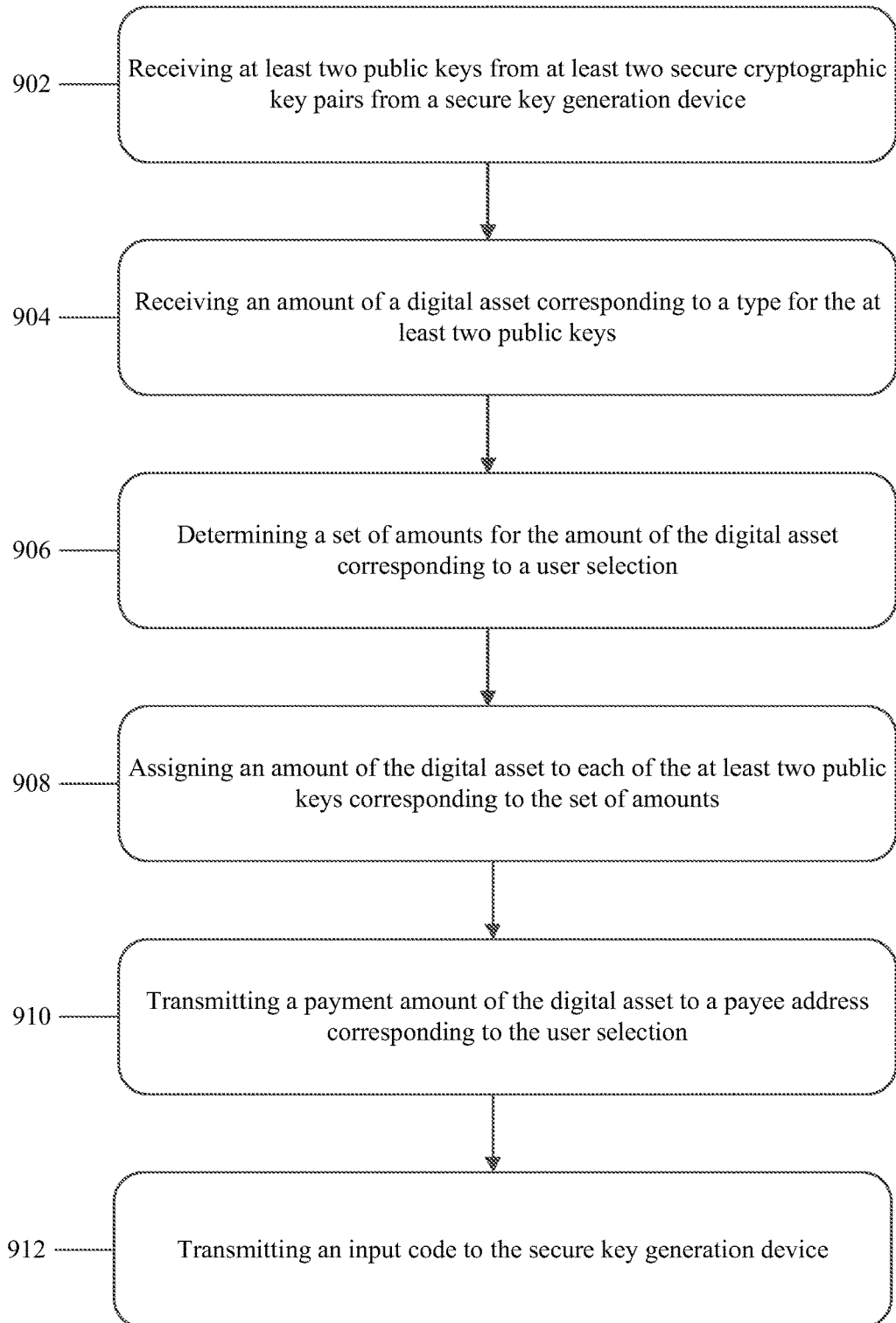
FIG. 9 relates to an example embodiment for implementing a method of cold payment utilizing the cold storage techniques disclosed herein.

FIG. 9 relates to an example embodiment for implementing a method of cold payment utilizing the cold storage techniques disclosed herein. The method may be executed by a device, such as the device depicted in FIG. 7 or 11, by a user wishing to securely make a cold payment. The depicted method may make use of the systems depicted herein, such as the systems depicted in FIGS. 1, 7 and 11. The method may include additional, fewer, or different steps depending on the functionality desired.

At block 902, the method may include receiving at least one public key from at least one secure cryptographic key pair from a secure key generation device. In other embodiments, the method may include receiving at least two or more (e.g. three, four, five, etc.) Public keys from at least two or more (e.g. three, four, five, etc.) Secure cryptographic keys pairs generated from a secure key generation device. At block 904, the method may include receiving an amount of a digital asset corresponding to a type for the at least two public keys. For example, the received public keys may correspond to addresses on the bitcoin blockchain network, and the digital asset received may be bitcoin, which would correspond to those addresses, that is the bitcoin could be stored at those addresses.

At block 906, the method may include determining a set of amounts for the amount of the digital asset corresponding to a user selection. As discussed above with respect to FIG. 7 the set of amounts may be determined by the user, or by a randomization process. At block 908, the method may include assigning an amount of the digital asset to each of the at least one public key corresponding to the set of amounts. In some embodiments, the amount assigned may be zero because that public key may be used as part of the payment.

At block 910, the method may include transmitting a payment amount of the digital asset to a payee address corresponding to the user selection. In some embodiments, the user indicates the payee address when they indicate the amount of the digital asset they wish to make a payment for. At block 912, the method may include transmitting an input code to the secure key generation device. This input code may be used to store the digital asset at the off-line cryptographic key pair.

In some embodiments, the cold payment method may require a token based on distributed ledger technology in order to process payments. The token may have no interaction with the key generation device but instead interacts with the online software and public keys produced by the device. In one embodiment, the token may provide a user access that allows to the system to process payments. As such, in some embodiments use of the token may incur a fee to the user for processing payments. For example, the fee may be deducted from the token amount, or the fee may be deducted from a digital asset balance that the user has stored elsewhere. In one embodiment this token may function as a protocol that allows the cold payment method to operate. In one embodiment the token may require a system of smart contracts that allows functionality to process payments.

Figure 10:
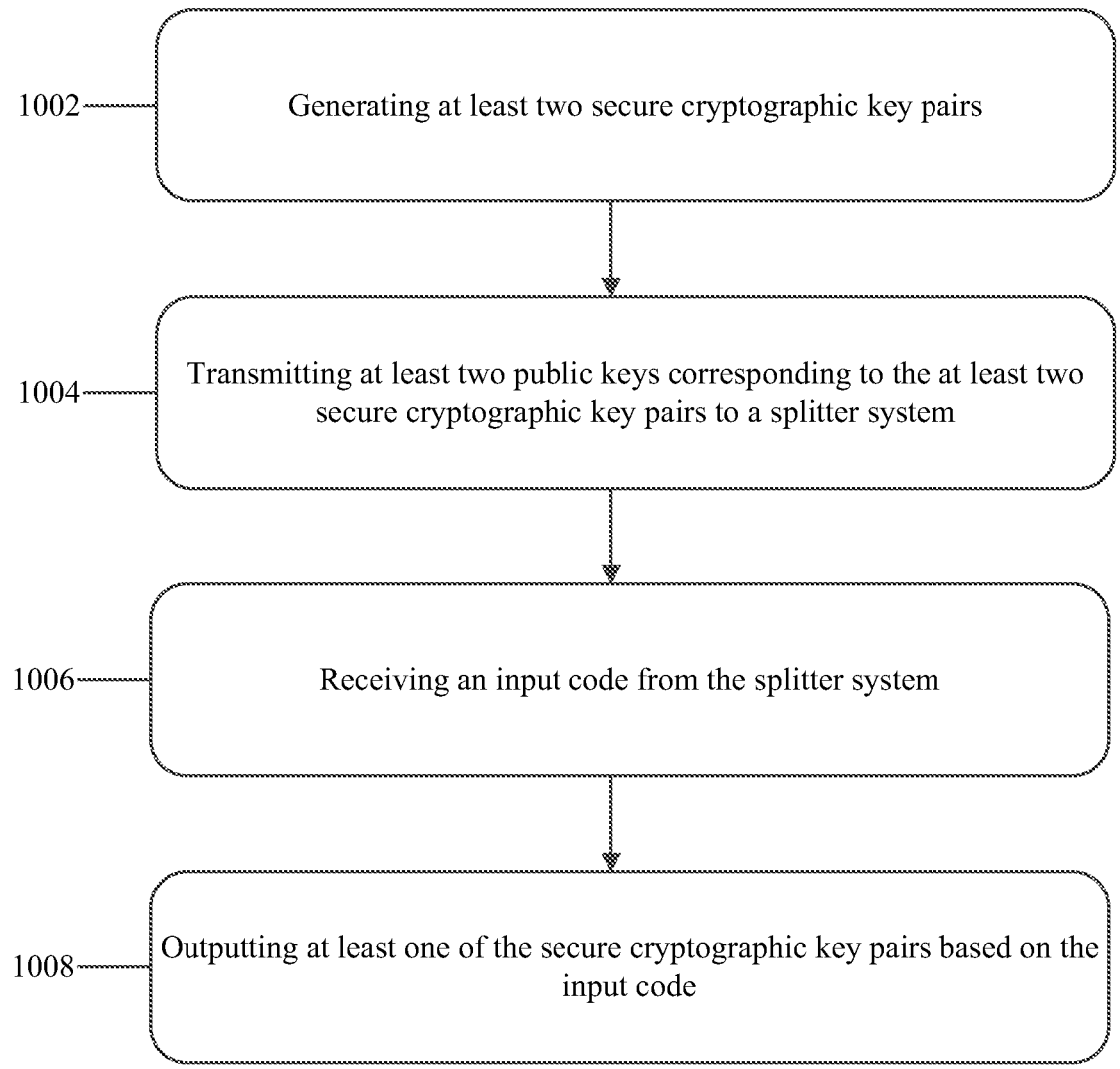
FIG. 10 relates to an example embodiment for implementing a method of cold payment utilizing the cold storage techniques disclosed herein.

FIG. 10 relates to an example embodiment for implementing a method of cold payment utilizing the cold storage techniques disclosed herein. The method may be executed by a device, such as the device depicted in FIGS. 1-5, by a user wishing to securely make a cold payment. The depicted method may make use of the systems depicted herein, such as the systems depicted in FIGS. 1, 7 and 11. The method may include additional, fewer, or different steps depending on the functionality desired.

At block 1002, the method may include generating at least one secure cryptographic key pair. In some embodiments of the method, the number of cryptographic key pairs to be used in the method of cold payment is automatically generated. The number of cryptographic key pairs to be automatically generated may be based on one or more randomization inputs from the user. The corresponding public keys for the generated cryptographic key pairs may be output to the splitter system. In this way, a user of the method does not have to be concerned with having too few keys for any type of payment.

At block 1004, the method may include transmitting at least one public key corresponding to the at least one secure cryptographic key pairs to a splitter system. In some embodiments, as mentioned above, the method may include transmitting two or more public keys corresponding to at least two or more cryptographic keys pairs if at least two or more cryptographic key pairs have been generated.

At block 1006, the method may include receiving an input code from the splitter system. In some embodiments, the input code may be received from a user of the device mentioned above that is executing the method. The input code itself may be a number unique to a set of public keys that correspond to a given payment. For example, if two public keys are output for one payment they may be added together, and a derivative of that summation may be used for the code. The method may include only accepting input codes that correspond to potential derivatives of the offline generated cryptographic key pairs. In this manner, because the input code is dependent on the offline generated public keys, the input code is protected from tampering when the method only accepts input codes that are a product of the offline randomization.

Lastly, at block 1008 the method may include outputting at least one of the secure cryptographic key pairs based on the input code. For additional protection, and for clearing hard drive space and/or memory cache, in some embodiments the method may include removing from a memory of a device, such as the device discussed herein, input codes (as well as public keys or other information involved with the payment) after they are transmitted.

Figure 11:
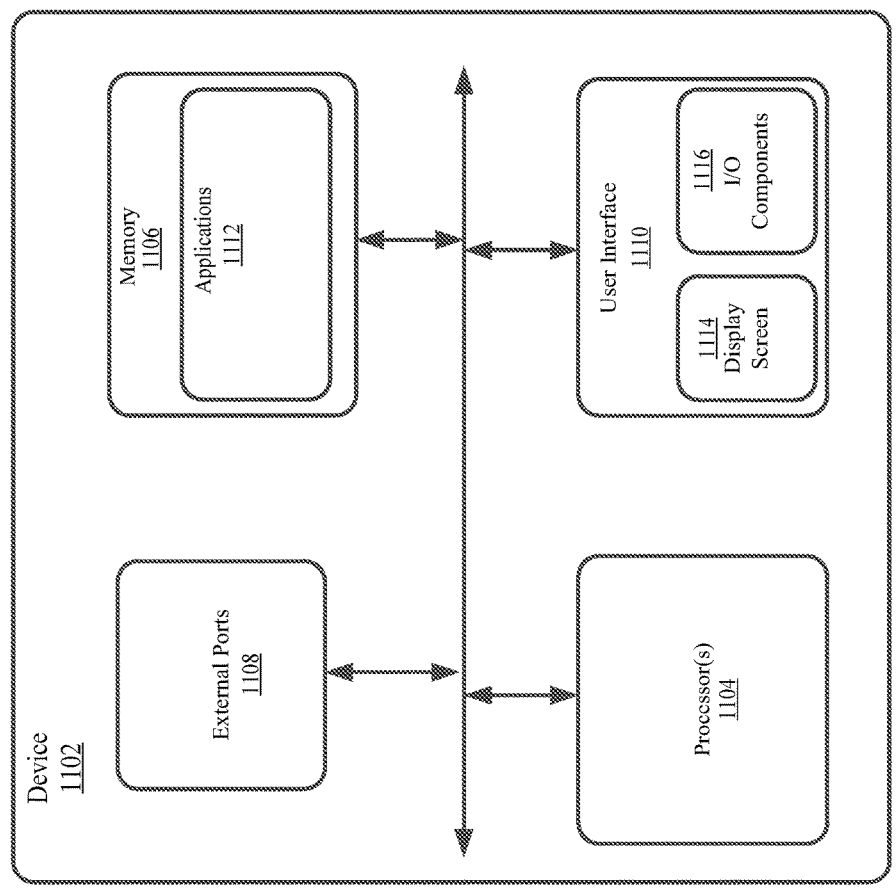
FIG. 11 relates to an example computer system for use with any of the systems and methods disclosed herein.

FIG. 11 relates to an example computer system 1100 for use with any of the systems and methods disclosed herein. For example, the computer system 1100 may be a device for use with the aforementioned off-line cryptographic key generation embodiments, or it may be a device for use with the aforementioned cold payment embodiments. In some cases, the system 1100 may have additional or fewer components. For example, in some cases, such as the cold payment embodiment, the system 1100 may have network connectivity that allows the system to connect to an external network such as the internet. Conversely, the system may not have network connectivity components capable of connecting to the internet when used for the off-line cryptographic key generation embodiments.

The system 1100 as depicted in FIG. 11 includes: a user of the system 102, a device 1102, one or more processors 1104, one or more memories 1106, one or more external ports 1108, and a user interface 1110. As noted above, there may be additional or fewer components in certain embodiments depending on the desired functionality of the system 1100.

The memory 1106 may include applications 1112 stored as computer programs that may ultimately be executed by the one or more processors 1104. The user interface 1110 may include a display screen 114 and input/output components 1116. The display screen may be used by a user, such as the user 102 of FIG. 1, to interact with the device 1102 and any underlying applications 1112 stored in memory 1106. Similarly, the input/output components 1116 may control functionality that allows a user of the device to execute particular actions on the device 1102.

In some embodiments, such as generating off-line cryptographic key pairs, the generation of the off-line cryptographic key pairs may be executed by the processor(s) 1104 working in conjunction with computer code stored in memory 1106, such as the aforementioned key generation manager described in FIGS. 3, 5, and elsewhere herein.

Similarly, in some embodiments, such as executing the functionality of the splitter piecer system 706 described with respect to FIG. 7, and elsewhere herein, the processor(s) 1104 may work in conjunction with computer code stored in memory 1106 to effectuate the steps in the disclosed cold payment solution.

Accordingly, the external ports 1108 may be utilized to capture and/or transmit relevant data for the disclosed embodiments. Similarly, the user interface 1110 including the display screen 1114 and the input/output components 1116 may take information in from a user and present that information to the user in accordance with the embodiments discussed herein. For example, the input methods disclosed in FIGS. 2*a*-2*d*, and the output methods disclosed in FIG. 4.

The methods and systems disclosed herein make use of software, or computer code that constitutes a computer program, which is stored in memory on a device. That software may in some embodiments be considered firmware as discussed herein. Firmware is, generally, a computer program that is stored in a non-volatile memory on a device. This means that the computer program may be effectively fixed in the devices storage, and much more difficult to make changes to including updating the firmware. The computer code may be, though not always; installed in memory at the time of manufacture of the memory itself thereby reducing risks associated with tampering that may occur at the time of installation.

In general, a computer program in accordance with the embodiments described herein may include a computer usable storage medium (e.g., standard random access memory (RAM), an optical disc, a universal serial bus (USB) drive, or the like) having computer-readable program code embodied therein, wherein the computer-readable program code may be adapted to be executed by a processor, such as the processor(s) 1104 of FIG. 11 (e.g., working in connection with an operating system that may, for example, be stored in memory 1106 of FIG. 11) to facilitate the functions as described herein. In this regard, the program code may be implemented in any desired language, and may be implemented as machine code, assembly code, byte code, interpretable source code or the like (e.g., via C, C++, Java, ActionScript, Objective-C, JavaScript, CSS, XML). In some embodiments, such as the splitter piecer system of FIG. 7, the computer program product may be part of a cloud network of resources.

Although the preceding text sets forth a detailed description of numerous different embodiments, it should be understood that the legal scope of the invention may be defined by the words of the claims set forth at the end of this patent. The detailed description is to be construed as exemplary only and does not describe every possible embodiment, as describing every possible embodiment would be impractical, if not impossible. One could implement numerous alternate embodiments, using either current technology or technology developed after the filing date of this patent, which would still fall within the scope of the claims.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Additionally, certain embodiments are described herein as including logic or a number of routines, subroutines, applications, or instructions. These may constitute either software (e.g., code embodied on a non-transitory, machine-readable medium) or hardware. In hardware, the routines, etc., are tangible units capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that may be permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that may be temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules may provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it may be communicatively coupled. A further hardware module may then, at a later time, access the memory device to retrieve and process the stored output. Hardware modules may also initiate communications with input or output devices, and may operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or routines described herein may be at least partially processor-implemented. For example, at least some of the operations of a method may be performed by one or more processors or processor-implemented hardware modules. The performance of certain of the operations may be distributed among the one or more processors, not only residing within a single machine, but deployed across a number of machines. In some example embodiments, the processor or processors may be located in a single location (e.g., within a home environment, an office environment, or as a server farm), while in other embodiments the processors may be distributed across a number of locations.

In some embodiments, the performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment may be included in at least one embodiment. The appearances of the phrase "in one embodiment" in various places in the specification are not necessarily all referring to the same embodiment.

As used herein, the terms "comprises," "comprising," "may include," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition a or b is satisfied by any one of the following: a is true (or present) and b is false (or not present), a is false (or not present) and b is true (or present), and both a and b are true (or present).

In addition, use of the "a" or "an" are employed to describe elements and components of the embodiments herein. This is done merely for convenience and to give a general sense of the description. This description, and the claims that follow, should be read to include one or at least one and the singular also may include the plural unless it is obvious that it is meant otherwise.

The patent claims at the end of this patent application are not intended to be construed under 35 U.S.C. § 112(f) unless traditional means-plus-function language is expressly recited, such as "means for" or "step for" language being explicitly recited in the claim(s). The systems and methods described herein are directed to an improvement to computer functionality, and may improve the functioning of conventional computers.

This detailed description is to be construed as examples and does not describe every possible embodiment, as describing every possible embodiment would be impractical, if not impossible. One could implement numerous alternate embodiments, using either current technology or technology developed after the filing date of this application.

What is claimed is:

1. A method for cold payment of digital assets, the method comprising:
   generating, at an off-line key generation device, which is a cold storage device, a set of off-line cryptographic key pairs;
   receiving, at a splitter piecer system, a set of public keys corresponding to the set of off-line cryptographic key pairs generated at the off-line key generation device;
   accepting, at the splitter piecer system, an aggregate amount of a digital asset based on a first user input from a user;
   accepting, at a splitter component of the splitter piecer system, at least two subdivided amounts based on a second user input;
   apportioning, at the splitter component, the subdivided amounts to each member of the set of public keys;
   sending, at a piecer component of the splitter piecer system, at least one of the subdivided amounts to at least one defined recipient based on the second user input,
   updating a recipient address corresponding to the at least one defined recipient with the sent amount; and
   reserving, at the piecer component, at least one other subdivided amount for the user.

2. The method of claim 1, further comprising:
   transmitting, at the piecer component, an input code to the off-line key generation device.

3. The method of claim 2, wherein the input code includes at least one public key of the set of public keys.

4. The method of claim 1, wherein each amount in the subdivided amounts is indicated in the second user input.

5. The method of claim 1, wherein the second user input further includes a randomization algorithm for determining subdivided amounts.

6. A system for cold payment of digital assets, the system comprising:
   one or more processors;
   one or more memories coupled to the one or more processors;
   one or more output devices coupled to the one or more processors;
   wherein the one or more memories store computer executable instructions configured to cause the one or more processors to:
   generate at an off-line key generation device, which is a cold storage device, a set of off-line cryptographic key pairs;
   receive at a splitter piecer system, comprising a splitter component and a piecer component, a set of public keys corresponding to the set of off-line cryptographic key pairs generated at the off-line key generation device;
   accept at the splitter piecer system an aggregate amount of a digital asset based on a first user input from a user;
   accept at the splitter component at least two subdivided amounts based on a second user input;
   apportion at the splitter component the subdivided amounts to each member of the set of public keys;
   send at the piecer component at least one of the subdivided amounts to at least one defined recipient based on the second user input,
   update a recipient address corresponding to the at least one defined recipient with the sent amount; and
   reserve at the piecer component at least one other subdivided amount for the user.

7. The system of claim 6, the computer executable instructions are further configured to cause the one or more processors to:
   transmit at the piecer component an input code to the off-line key generation device.

8. The system of claim 7, wherein the input code includes at least one public key of the set of public keys.

9. The system of claim 6, wherein each amount in the subdivided amounts is indicated in the second user input.

10. The system of claim 6, wherein the second user input further includes a randomization algorithm for determining subdivided amounts.

* * * * *